April 16, 1968   E. D. EICH ET AL   3,378,419
METHOD OF MAKING SYNTHETIC-FILM INSULATED HIGH-VOLTAGE CABLE
Filed June 22, 1964

INVENTORS
EDWARD D. EICH
ERIC O. JUHLIN
ECKART BERLING

THEIR AGENT

United States Patent Office 3,378,419
Patented Apr. 16, 1968

3,378,419
METHOD OF MAKING SYNTHETIC-FILM
INSULATED HIGH-VOLTAGE CABLE
Edward D. Eich, Tarrytown, Eric O. Juhlin, Hastings-on-Hudson, and Eckart Berling, New York, N.Y., assignors to Anaconda Wire and Cable Company, a corporation of Delaware
Filed June 22, 1964, Ser. No. 376,770
10 Claims. (Cl. 156—53)

ABSTRACT OF THE DISCLOSURE

In the manufacture of high-voltage power cables with an insulating layer built up of wrappings of synthetic tapes, the tapes are coated with high-viscosity oil before they are wound onto the cable cores.

Figure 1:
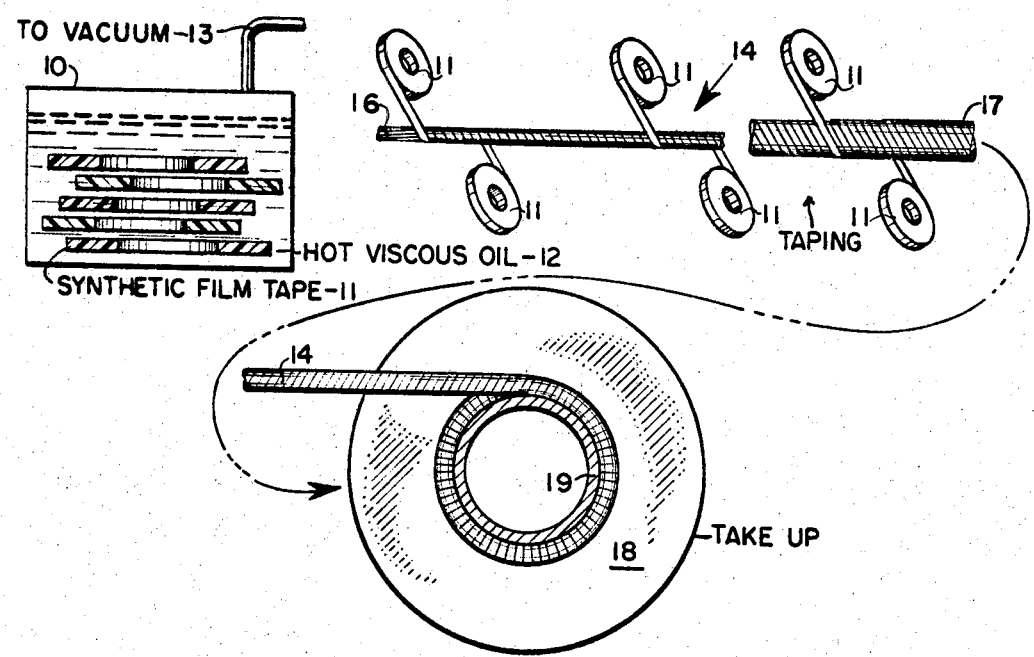

Our invention relates to synthetic-film insulated electric cables and particularly to a method for making such cables free from wrinkles in the film.

In the manufacture of electric power cables for use at high voltages, such, for example, as 100,000 volts, the insulation is applied to the cable conductor in the form of tapes, with the insulation wall, which is necessarily thick in order to withstand the high voltage, being built up of a large plurality of thin tapes. The individual tapes are kept thin to minimize the thickness of the butt spaces between adjacent tapes, since these spaces constitute the weakest portion of the insulation, electrically.

During the application of the tapes the conductor is continuously passed in a straight line through a plurality of taping heads and the insulation wall is increased until the desired thickness is reached. The cable core thus formed is taken up on reels which are placed in vacuum impregnating tanks where the cables are thoroughly dried and saturated with cable oil. Almost universally, the insulating tapes that have been applied to high-voltage cables up to now are paper tapes. However, as the interest in higher voltages has increased there has arisen a greater commercial interest in the possibility of using synthetic film tapes such as tapes of polyethylene, polypropylene, polyethylene terepthalate, and polycarbonate. The synthetic film tapes have, however, unexpectedly introduced a severe problem into the manufacture of high voltage cables in that such tapes do not slip on themselves as readily as do the paper tapes which are usually used for insulation. As a result it has been found difficult or impossible to form the cable core into coils on the take-up reels as they leave the taping machine, for, it must be understood, when a taped cable is bent the tapes at the outside of the bend slide over each other so as to increase the distances between the butt spaces and the tapes of the inside of the bend slide together so as to decrease the butt spaces. A severe stiffness in polycarbonate-film insulated cable was reported from this cause in Patent 3,105,872 where it was disclosed that the cable could be coiled onto reels when it was insulated with film tapes that had been previously embossed with a suitable pattern. Although a cable made from embossed tapes has utility, it is frequently found, after a cable is taken apart, that many of the tapes are wrinkled. Wrinkling is, of course, undesirable since it increases the spacing between tapes locally and provides points of electrical stress concentration and it is a feature of our present invention that we have entirely avoided the wrinkling of synthetic film tapes when the cable cores are coiled on reels from the taping machine.

We have accomplished this by applying a lubricant to the tape surface prior to wrapping the tape around the cable conductor. Since the tape is synthetic film the lubricant does not penetrate it but merely remains on the surface. The lubricant must, however, have good electrical properties and must not react chemically with the material of the tape or have a solvent action on it. Cable insulating oil was our first choice for a lubricant having the above-mentioned properties. Such an oil has fairly low viscosity since it is required to flow readily during the heat cycling of the cable. We found, however, that the application of standard viscosity cable oils did not have the desired effect of reducing the friction between cable tapes. Surprisingly, however, we discovered that very viscous oils did have the desired effect. Particularly, we prefer oils with an S.U.S. (Saybolt Universal second) viscosity at 100° F. of 20,000–150,000 and can use oils as low as 3000 S.U.S. and up to 200,000 S.U.S. Because of their established dielectric properties, natural hydrocarbon oils are currently used, but suitable natural oils are not available in a wide choice of viscosities. We have found, however, that synthetic polybutene oil, with even better electrical properties than the natural oil, is available with the desired high viscosity and can be used advantageously in our method of making wrinkle-free high-voltage cables cores. Synthetic polypropylene oils of the desired viscosity are also preferred.

Our new method of making a high-voltage cable core comprises the steps of coating a synthetic film tape such, for example, as polycarbonate or polypropylene tape with a lubricant such, for example, as polybutene or polypropylene oil. The oil will preferably have a viscosity at 100° F. of between 3000 and 200,000 S.U.S., or more preferably, between 20,000 and 150,000. A plurality of layers of the coated tape are wrapped around a metallic conductor to form an insulated cable core which is taken up in coils on a reel without creasing the tape, and vacuum dried. Thereafter the core can be treated in various known ways according to the type of cable desired. If the core is to be used in pipe-type cable it may be stored in moisture-free containers until it is pulled into a pipe at the cable site, with pressurized oil or gas added to the pipe. If the core is to be lead sheathed, vacuum dried cable oil may be added to the vacuum drying tank to saturate the core which may then be sheathed in a conventional lead press. Also, the core may be leaded first and then vacuum dried, and the oil added.

A more thorough understanding of our invention may be gained from the appended drawing.

In the drawing:

FIGURE 1 schematizes the steps of the method of our invention.

Figure 2:
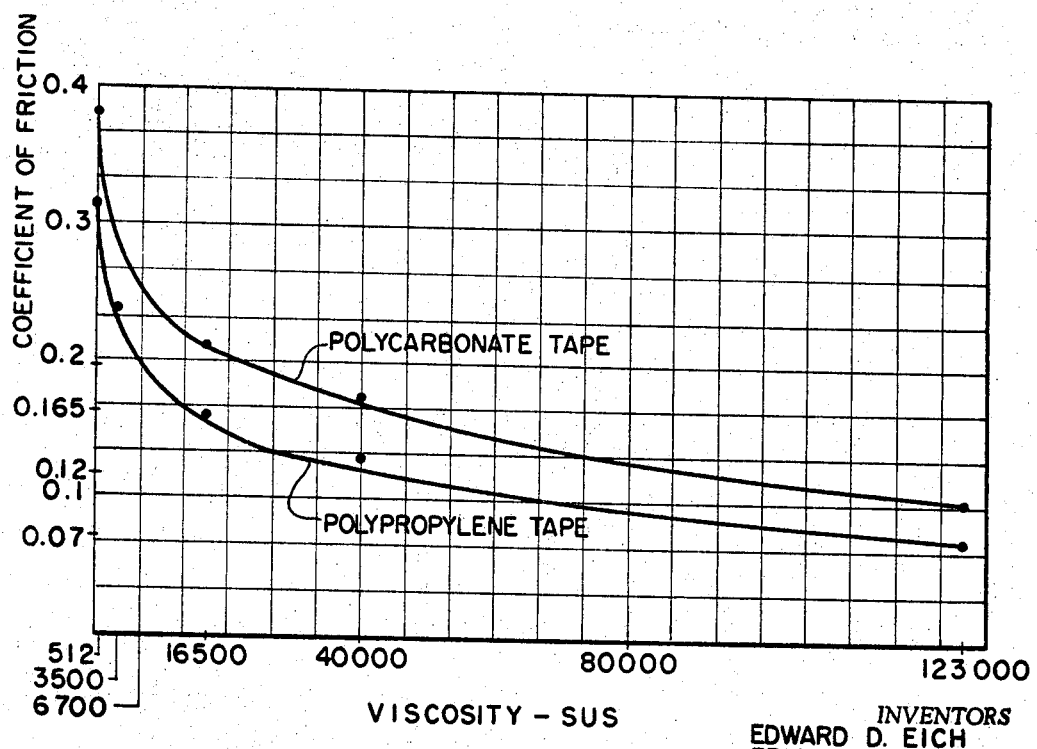

FIGURE 2 shows a plot of coefficient of friction vs. viscosity of tape lubricant.

In accordance with this method a sealed tank 10 holding pads 11 of synthetic film tape is filled with enough hot viscous oil 12 to cover the pads 11. Although the oil has a viscosity of the order of 123,000 S.U.S. at 100° F., it may be heated to 275° F. when the synthetic film is of a material such as polycarbonate that is capable of withstanding so high a temperature. Vacuum is applied to the tank 10 through a vacuum nipple 13 from a suction pump, not shown, to evacuate the air from the tape surfaces so that the oil penetrates between the layers on the pads 11. This is a convenient and inexpensive method of mass coating the synthetic tape with lubricating oil, but other methods, such as spraying or roller coating may be employed within the scope of our invention and may be preferred when the viscosity of the oil cannot be reduced sufficiently by heating to use the method shown in FIGURE 1. A plurality of the pads 11 are then mounted in a taping machine indicated generally by the numeral 14. Many types of suitable taping machines are known and the choice of such machine does not constitute an element of our invention. Such machines are capable of applying many layers, one hundred and fifty layers being not unusual, and the thick sections so built up have made the prior art cable cores rigid and difficult to remove from the taping machine onto reels. In the machine 14 the tape pads 11 are rotated around a conductor 16 until a cable core 17 has been built up having the desired thickness of insulation. The core 17 is then taken up on a reel 18 having a drum 19. Although the diameter of the drum 19 is made as large as practicable, it is obvious from FIGURE 1 that if the layers of tape cannot slide upon each other they will wrinkle and buckle on the inside of the turns around the drum where, of course, they are subject to a compressive force.

Example 1

25 layers of ¾" wide, embossed, Lexan [1] polycarbonate film tape 3 mils thick were wound on 3 lengths of flexible mandrel 1.9 inches in diameter to make a simulated cable core. The resulting lengths of core were bent around cylinders 7, 12½ and 16¼ inches in radius and the bending forces were found to be 17, 10, and 4 lbs. respectively.

The polycarbonate film material is composed of linear aromatic polyesters of carbonic acid. The ester of carbonic acid, which in its polymerized form was used for the examples of this application, is the ester with 2,2-(4,4'-dihydroxydiphenylene)-propane. It is known to prepare this polymer by heating the bis-phenylcarbonate of 2,2-di-(p-hydroxyphenylene)-propane along with small proportions of calcium hydride and sodium benzoate. A polymer having similar properties can be prepared by heating a mixture of the bis-phenylcarbonate of 2,2-di-(p-hydroxyphenylene)-propane and the bis-ethyl carbonate of 2,2-di-(p-hydroxyphenylene)-propane along with a small proportion of the sodium salt of 2,2-di-(p-hydroxyphenylene)-propane.

Example 2

25 layers of ¾" wide, embossed, Lexan polycarbonate film tape 8 mils thick were wound on a length of flexible mandrel 2.3 inches in diameter to make a simulated cable core. The resulting length of core was bent around cylinders 7, 12½ and 16¼ inches in radius and the bending forces were found to be 21, 16, and 10 lbs., respectively.

Example 3

25 layers of ¾" wide, embossed, Lexan polycarbonate film tape, 3 mils thick, were coated with polybutene oil having a viscosity at 100° F. of 512 S.U.S. (Amoco [2] LF 4247) and wound on a flexible mandrel 1.9 inches in diameter to simulate a cable core. The resulting length of core was bent around the cylinders of Example 1 and the bending forces were found not to be appreciably lower than the forces of Example 1 where the tapes were not lubricated.

Example 4

A simulated cable core was prepared as described in Example 3 except that polybutene oil having a viscosity of 40,000 S.U.S. at 100° F. (Oronite [3] 24E) was used as the lubricant. The core was bent around cylinders 7, 12½ and 16¼ inches in radius and the bending forces were found to be 12, 6½ and 4½ lbs., respectively.

Example 5

A simulated cable core was prepared as described in Example 3 except that polybutene oil having a viscosity of 123,000 S.U.S. at 100° F. (Oronite 32E) was used as the lubricant. The core was bent around cylinders 7, 12½ and 16¼ inches in radius and the bending forces were found to be 11, 8½ and 6 lbs., respectively.

[1] Trademark of the General Electric Co.
[2] Amoco is a trademark of the American Oil Co.
[3] Oronite is a trademark of the California Chemical Co.

Example 6

A simulated cable core was prepared as described in Example 2 except that the tape was prelubricated with Oronite 24E polybutene. The core was bent around cylinders 7, 12½ and 16¼ inches in radius and the bending forces were found to be 11, 8, and 6 lbs., respectively.

In the examples the 12½ inch radius, when used to test the simulated cores, most closely approximates the bending strains that might be encountered by cable cores in practice. When the results of Example 1 are compared with those of Examples 4 and 5, it is noted that whereas the bending force on the dry tape core was 10½ lbs., the tapes lubricated with thick oil required only 6½ and 8½ lbs. It was most surprising to find from Example 3 that a standard viscosity cable oil failed to reduce the bending force. A further comparison can be made of Examples 2 and 6 using the heavier, 8-mil tapes. Here the use of 40,000 S.U.S. oil reduced the required bending force from 16 to 8 lbs.

Example 7

Coefficient of friction measurements were made by pulling embossed polypropylene and polycarbonate tapes horizontally between identical tapes fixed under them and over them with a weight of selected magnitude loading the upper tape. This was done using oils of different viscosities to lubricate the tapes, with the coefficient of friction calculated according to the formula, $$f = \frac{F}{2P}$$

where $f$ = coefficient of friction, $F$ = the force, in pounds, required to pull the tape, and $P$ = the load, in pounds, on the upper tape. In the instant case the load was selected to produce a pressure of 5 p.s.i.

The results are shown in Table 1 and FIGURE 2.

TABLE 1

| Oil viscosity S.U.S. | Coefficient of friction | |
|---|---|---|
| | Polypropylene | Polycarbonate |
| 512 | 0.313 | 0.38 |
| 3,500 | 0.24 | 0.29 |
| 16,500 | 0.156 | 0.21 |
| 40,000 | 0.13 | 0.17 |
| 123,000 | 0.07 | 0.1 |

Table 1 illustrates the very surprising fact that the coefficient of friction decreases consistently as the viscosity of the lubricant increases. This is more surprising when it is considered that the tests were run at room temperature where the oil with viscosity of 123,000 S.U.S. at 100° F. has an almost gummy consistency. To test whether or not this unexpected lowering of friction with increased oil viscosity was due to some synergism, a coefficient of friction test was run on steel tapes using the same oils with the results shown in Table 2.

TABLE 2

| Oil viscosity S.U.S. at 100° F.: | Coefficient of friction |
|---|---|
| 512 | 0.18 |
| 3,500 | 0.16 |
| 16,500 | 0.14 |
| 40,000 | 0.18 |
| 123,000 | 0.17 |

There is no significant correlation between friction and viscosity for steel strip.

We have invented a new and useful method of making cable cores for which we desire an award of Letters Patent.

We claim:
1. The method of making a high-voltage cable core comprising the steps of:
(A) coating a synthetic film tape with viscous hydro- carbon oil having a viscosity at 100° F. between 3000 and 200,000 S.U.S., (B) wrapping a plurality of layers of said tape, coated with said oil, around a metallic conductor, to form an insulated cable core, (C) taking up said core in the form of a coil without creasing said tape, and (D) vacuum drying said core.

2. The method of claim 1 wherein said tape is polycarbonate film.

3. The method of claim 1 wherein said tape is polypropylene film.

4. The method of claim 1 wherein said oil is polybutylene.

5. The method of claim 1 wherein said oil is polypropylene.

6. The method of making a high-voltage cable core comprising the steps of:

(A) coating a synthetic film tape with viscous hydrocarbon oil having a viscosity at 100° F. between 20,000 and 150,000 S.U.S.

(B) wrapping a plurality of layers of said tape, coated with said oil, around a metallic conductor to form an insulated cable core, (C) taking up said core in the form of a coil without creasing said tape, and (D) vacuum drying said core.

7. The method of claim 6 wherein said tape is polycarbonate film.

8. The method of claim 6 wherein said tape is polypropylene film.

9. The method of claim 6 wherein said oil is polybutylene.

10. The method of claim 6 wherein said oil is polypropylene.

References Cited

UNITED STATES PATENTS

| | | | |
|---|---|---|---|
| 3,077,514 | 2/1963 | Kang | 174—120 |
| 3,105,872 | 10/1963 | Thompson et al. | 174—120 |
| 3,217,084 | 11/1965 | Feick | 156—56 X |
| 3,217,094 | 11/1965 | Volk | 174—120 |

EARL M. BERGERT, *Primary Examiner.*

T. R. SAVOIE, *Assistant Examiner.*